United States Patent [19]
Boothe et al.

[11] Patent Number: 5,957,542
[45] Date of Patent: Sep. 28, 1999

[54] THEFT-PROOF NON-ROTATING WHEEL COVER WITH REPLACEABLE ORNAMENT

[76] Inventors: Ralph T. Boothe, 2478 Lazy Brook La., Hacienda Heights, Calif. 91745; Rafael E. Bonilla, 7252 Garden Grove Blvd., Westminster, Calif. 92683

[21] Appl. No.: 08/866,704

[22] Filed: May 30, 1997

[51] Int. Cl.⁶ ..................................................... B60B 7/20
[52] U.S. Cl. ................................... 301/37.25; 301/37.37; 301/108.4
[58] Field of Search ................................ 301/37.1, 37.21, 301/37.25, 37.26, 108.1, 108.4, 37.37; 40/587

[56] References Cited

U.S. PATENT DOCUMENTS

| | | |
|---|---|---|
| 710,195 | 9/1902 | Jones . |
| 2,014,058 | 9/1935 | Tonai ........................................ 301/108 |
| 2,169,237 | 8/1939 | Gasco ......................................... 40/129 |
| 2,548,070 | 4/1951 | Ryan ........................................... 40/129 |
| 2,869,262 | 1/1959 | Lucas .......................................... 40/129 |
| 4,388,771 | 6/1983 | Lalonde ............................. 301/37.25 X |
| 4,678,239 | 7/1987 | Matsushita ................................. 301/37 |
| 4,781,419 | 11/1988 | Boothe ...................................... 301/108 |
| 5,190,354 | 3/1993 | Levy et al. ............................. 301/37.25 |
| 5,490,342 | 2/1996 | Rutterman et al. ......................... 40/587 |
| 5,588,715 | 12/1996 | Harlen ................................... 301/37.25 |
| 5,659,989 | 8/1997 | Hsiao et al. ...................... 301/37.25 X |

FOREIGN PATENT DOCUMENTS

| | | | |
|---|---|---|---|
| 3919268 | 1/1991 | Germany | ............................ 301/37.25 |

*Primary Examiner*—Russell D. Stormer
*Attorney, Agent, or Firm*—Gene Scott-Patent Law & Venture Group

[57] ABSTRACT

A wheel cover provides a base for supporting the device within a central cavity in an automotive wheel. A cover plate is mounted in a bearing within the base and is weighted for non-rotational support on the wheel. A weight is supported within the cover plate so as to bias the cover plate in a preferred position. The weight is engaged within the cover plate by a negative draft angle on a peripheral lip of the cover plate so as to be asymmetrical with respect to the rotational axis of the wheel.

12 Claims, 3 Drawing Sheets

FIG. 2
FIG. 3
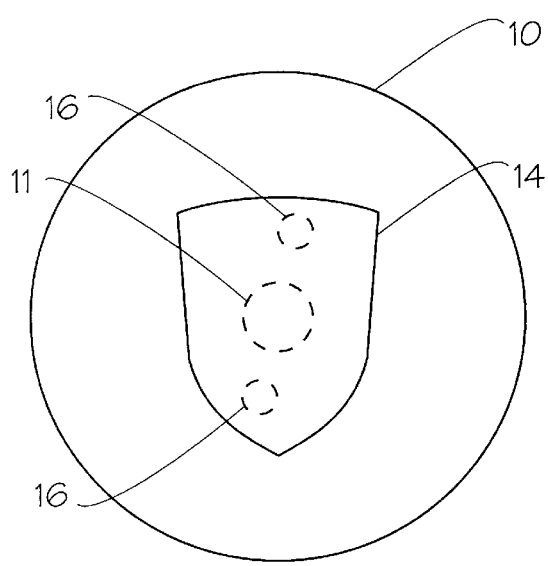
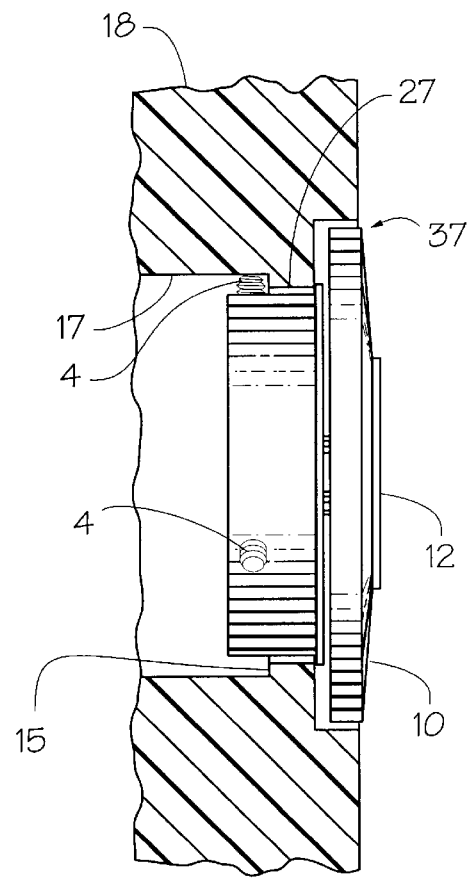

FIG. 4
FIG. 5
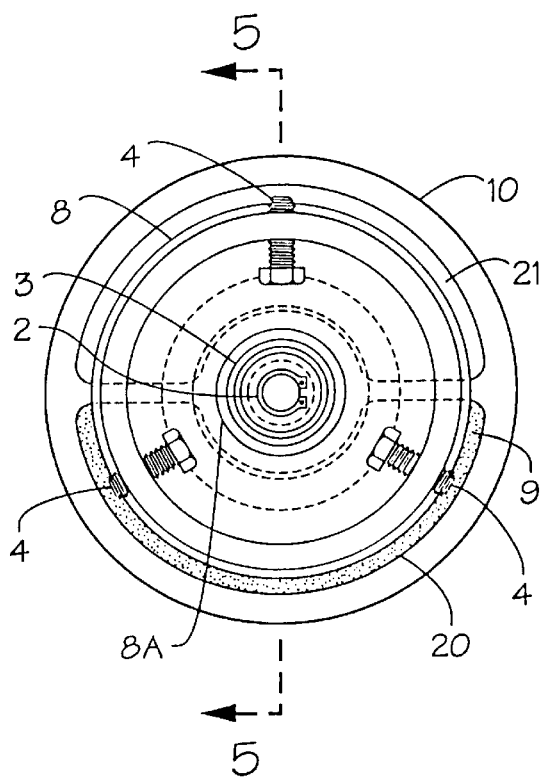
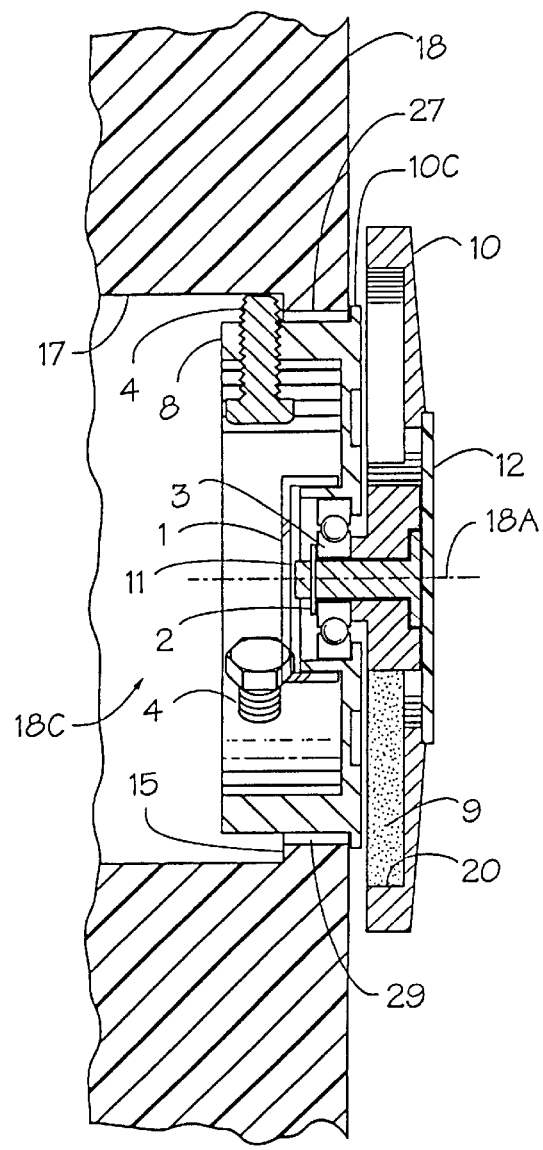

THEFT-PROOF NON-ROTATING WHEEL COVER WITH REPLACEABLE ORNAMENT

BACKGROUND OF THE INVENTION

1. Field of the Invention

This invention generally relates to automotive wheel covers, and more particularly to an ornamental wheel cover having a means for non-rotation on a spinning wheel and a means for thwarting theft of the ornamental cover.

2. Description of Related Art

The following art defines the present state of this field:

Jones, U.S. Pat. No. 710,195 describes an advertising display device adapted to be applied to vehicle-wheels and is supported on the wheel in such manner as to be stationary or non-rotative with respect to the vehicle, whereby the advertising matter displayed on the device will always be in position for proper display and inspection not withstanding the rotation of the wheel.

Tonai, U.S. Pat. No. 2,014,058 describes an invention that related to hub caps and its general object is to provide a hub cap primarily designed for the wheels of motor vehicles, that includes a name plate which is mounted so as to not rotate with the wheel and therefore remains substantially stationary, with the result it not only adds materially to the ornamentality of the wheel, but the name on the plate can be distinguished while the vehicle is in motion.

Gasco, U.S. Pat. No. 2,169,237 describes a stationary ornament for wheel hubcaps in such a manner that the ornament remains in a stationary position while the wheel is rotating by the vehicle traveling in a forward direction. In this type of construction the nameplate is mounted on the wheel or wheel hubcap by a free running or anti-friction bearing of some type.

Ryan, U.S. Pat. No. 2,548,070 describes an improved advertising display device adapted for use on motor vehicles. This invention is comprised of a sign carrying member having imprinted on one side thereof media or indicia, which said member is especially adapted for attachment to a non-rotatable axle of a motor vehicle in rotatably mounted on said axle. It provides an advertising display device for use on motor vehicle of various types, such as trucks, taxicabs, buses or the like.

Lucas, U.S. Pat. No. 2,869,262 describes improvements in wheel-supported advertising signs, and its principal object is to provide a convenient means for attaching an advertising sign to the hub cap of an automobile wheel in such a manner that the advertising sign is held against revolving movement while the wheel rotates, and which presents its advertising material in readable position at all times. This invention provides an anchoring means or adapter for the sign centrally of the hub cap and arranged in such a manner that it takes up little space for accommodation in relatively small tolerances between the cap and an axle extending into the same.

Matsushita, U.S. Pat. No. 4,678,239 describes a hub cap assembly having a non-rotating wheel cover consisting of a disc like body on which indicia, advertising material, trademarks and the like can be place. The cover body is provided with a weight on its back surface acting to normally maintain the cover in a given orientation and is held on an outer bracket fitted with an annular bearing at its center and radially extending spokes through which the cover body is attached. An annular bearing is located within the annular center of the outer flange and is resiliently attached to the central boss portion of an inner bracket. The inner bracket being provided with a plurality of radial stays having a V-shaped clip at its end adapted to engage with the rim portion of the wheel.

Boothe, U.S. Pat. No. 4,781,4 describes a hub cap locking arrangement, in which, in a first embodiment, a hub cap having a cup-shaped configuration with a generally tubular portion insertable into the wheel hub opening, the tubular portion having a diameter slightly smaller than the diameter of the wheel hub opening of an alloy vehicle wheel. The hub cap may be formed from cast or machined metal or plastic material and is provided with a plurality of radially extending threaded apertures, through which extend pointed threaded members of high strength metal, the threaded members having either a hex head opening or a slotted end.

Levy et al., U.S. Pat. No. 5,190,354 describes a wheel cover for the wheel of a vehicle, comprising a securement and support device secured to the hub or to the rim of the wheel and a substantially flat shield element, mounted on the device for rotation and having an asymmetric spacing of its mass relative to its axis of rotation, permitting the shield element to maintain a fixed angular position relative to the horizontal, even during rotation of the wheel.

Rutterman et al., U.S. Pat. No. 5,490,342 describes a wheel cover for mounting on a wheel rim comprising a base member having a disc member rotatably mounted thereto to display an indicia thereon, the base member and disc member each includes stabilizing structure configured to mate with each other to maintain concentric alignment and restrict oscillation of the disc member relative to the base member and a counterweight attached to the disc member such that as the base member rotates with the wheel rim the disc member does not rotate relative to the vehicle so that the indicia on the disc member can be viewed as the vehicle translates over the supporting surface.

Harlen, U.S. Pat. No. 5,588,715 describes a non-rotatable wheel cover assembly including a mounting assembly for mounting the wheel cover directly to a wheel-supporting member of a vehicle. The wheel cover has inner and outer surfaces and the wheel-supporting member is disposed for supporting wheels of the vehicle during rotation thereof. The mounting assembly includes a first attaching element mounted on the inner surface of the wheel cover and a wheel cover support assembly for secured relation of the first attaching element and the wheel supporting member. The wheel cover support assembly is disposed for non-rotational support of the first attaching element and the wheel cover during rotation of the wheel.

The prior art teaches a variety of weighted wheel covers for the purpose of fixed orientation during wheel rotation. However, the prior art does not teach that such a cover can be mounted so as to be removable only from the rear of the wheel, as an anti-theft feature, that the rotating cover plate portion can be fabricated as a relatively thin member by pouring lead into a cavity having a negative draft angle for capturing the solidified lead plug, or that the wheel and cover can cooperate to enable the cover to be flush mounted in the face of the wheel. Further, the prior art does not teach that the cover may cooperate with an insignia plate so as to allow replacement of the insignia plate. These advantages are novel to the present invention and come into being through the particular structural elements and their interrelationships which are considered novel, constituting new invention. The present invention provides further related advantages as described in the following summary.

SUMMARY OF THE INVENTION

The present invention teaches certain benefits in construction and use which give rise to the objectives described below.

A wheel cover provides a base for supporting the device within a centrally located cavity in an automotive wheel. A cover plate is mounted in a bearing within the base and is weighted for non-rotational support on the wheel. A weight is supported within the cover plate so as to bias the cover plate in a preferred position. The weight is engaged within the cover plate by a negative draft angle on a peripheral lip of the cover plate so as to be asymmetrical with respect to the rotational axis of the wheel.

A primary objective of the present invention is to provide a non-rotating wheel cover having advantages not taught by the prior art.

Another objective is to provide such a wheel cover that is only removable from the wheel by first dismounting the wheel itself from, for instance, an automobile, so as to thwart wheel cover theft.

A further objective is to provide such a wheel cover that is mounted flush on the wheel so as to appear to be a part of the wheel itself, but which maintains a preferred orientation while the wheel rotates.

A still further objective is to provide such a wheel cover that is easily fabricated by virtue of the installation of a weighting element within the wheel cover such that a peripheral retaining lip having a negative entrant angle prevents the element from being dislodged.

A further advantage of the present invention is to provide a means for replacing an insignia plate on the weighted cover plate of the device, so as to allow the device to be used with a wide range of insignia plates.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 2 is a front elevational view thereof;

FIG. 3 is a side elevational view thereof shown in relationship to a wheel into which it mounts;

FIG. 4 is rear elevational view of the invention; and

FIG. 5 is a sectional view taken along cutting plane line 5—5 in FIG. 4.

DETAILED DESCRIPTION OF THE INVENTION

Figure 1A:
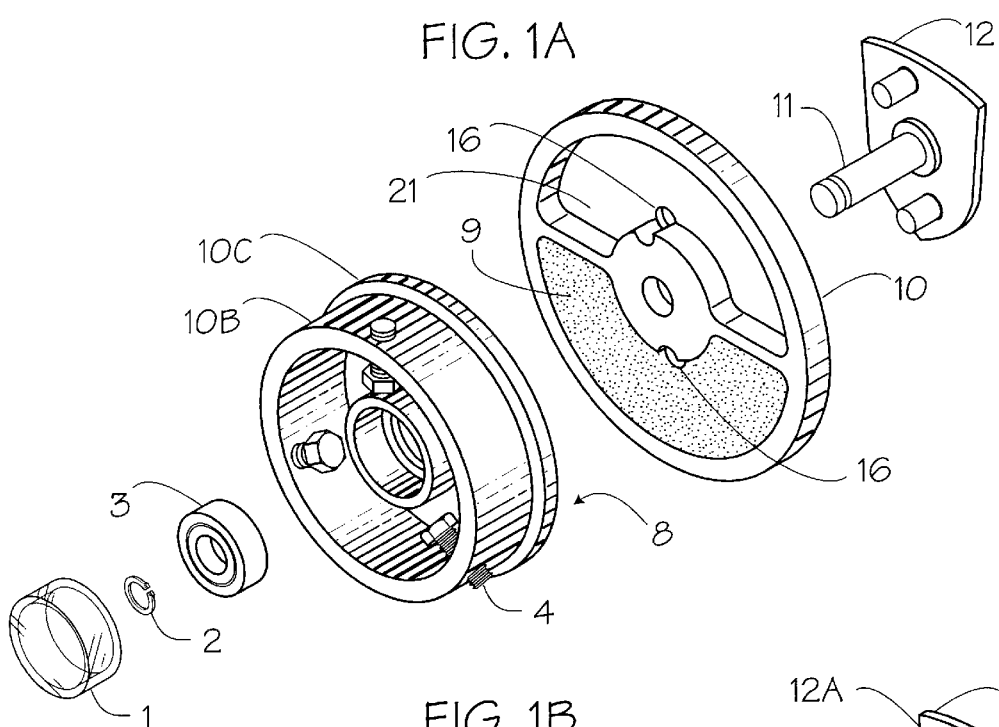
FIG. 1A is a perspective view of a first preferred embodiment of the present invention shown with the various parts and elements in exploded relationship.

The above described drawing figures illustrate the invention, a wheel cover device used in conjunction with an automotive wheel 18 having an axis of rotation 18A. The wheel cover device is comprised of a mounting base 8 having a means for wheel engagement 4, in the present example, a set of three bolts mounted radially to be rotated outwardly on machine threads within the mounting base, and a means for bearing engagement 8A, such as the cylindrical casing shown in FIGS. 4 and 5. The mounting base 8 is supported within a mounting cavity 18A formed on the axis of rotation 18A of the automotive wheel 18 by the wheel engagement means 4. A bearing means 3 such as the cylindrical bearing shown, is engaged within the bearing engagement means 8A of the mounting base 8, preferably by a press-fit, and is thereby positioned for rotation on the axis of rotation 18A. A cover plate 10 is positioned adjacent to the bearing means 3, the cover plate providing a cover plate mounting hole 10A positioned on the axis of rotation 18A and a means for weighting 9, preferably a leaded material poured into the cover plate 10. The weighting means 9 is positioned asymmetrical to the axis of rotation 18A and is supported in the cover plate 10 by a peripherally enclosing side lip 20. The side lip 20 preferably has a negative draft angle that therefore captures and locks the weighting means 9 within the cover plate 10. The device is also comprised of a means for rotational engagement 7 or 11, between the cover plate 10 and the bearing means 3. With the automotive wheel 18 and the mounting base 8 in rotation, the cover plate 10 is biased by the weighting means 9 to maintain a non-rotating position with the weighting means 9 urging the cover plate 10 toward a preferred attitude as the wheel 18 rotates.

In one embodiment shown in FIG. 1A, the device may further includes a separate insignia plate 12. The means for rotational engagement in this case, is a shaft 11 fixed to, and extending outwardly from the insignia plate 12. The shaft 11 penetrates the mounting hole 10A of the cover plate 10 and the bearing means 3 and is then secured with a shaft locking means in this case a C-shaped snap washer 2.

Figure 1B:
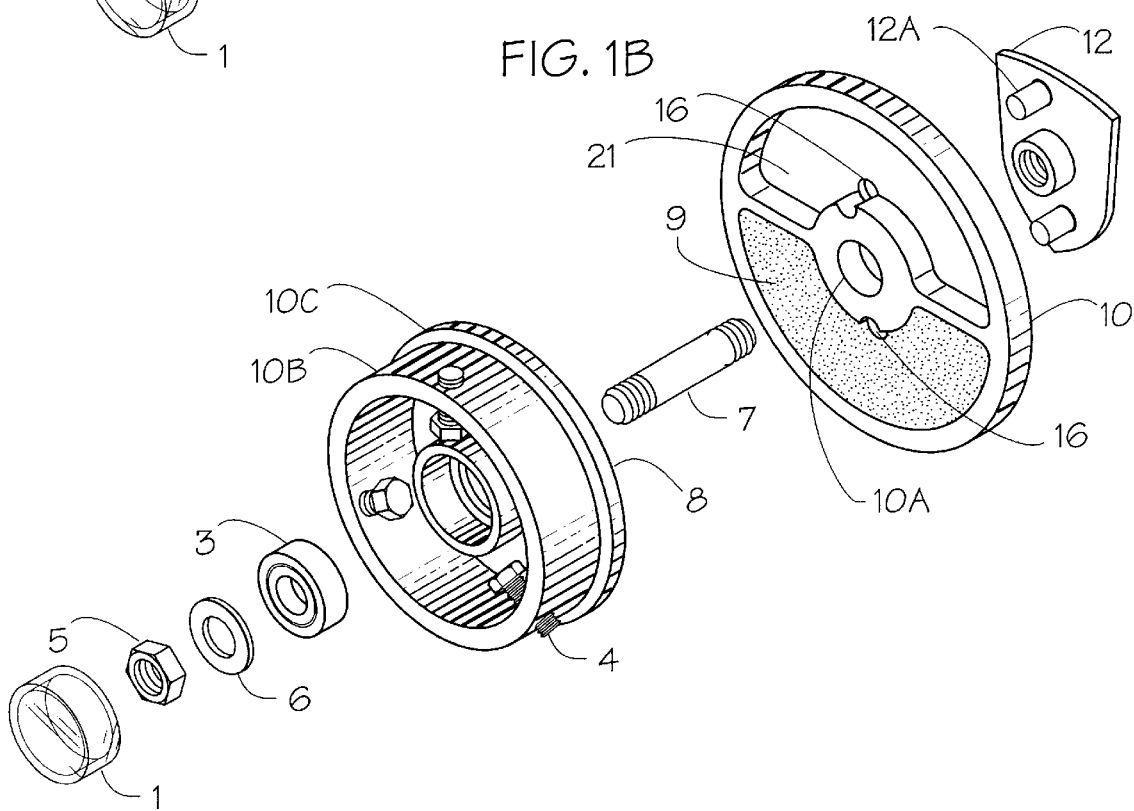
FIG. 1B is a perspective view of a second preferred embodiment of the present invention shown with the various parts and elements in exploded relationship.

In another embodiment shown in FIG. 1B, the device further includes the insignia plate 12. The means for rotational engagement is an alternate shaft 7 removably engaged with, and extending outwardly from the insignia plate 12. The shaft 7 penetrates the mounting hole 10A of the cover plate 10 and the bearing means 3 and is secured with a shaft locking means, in this case a plain washer 6 and nut 5.

Preferably, the insignia plate 12 and cover plate 10 together provide a common interengagement means such as the two studs 12A and holes 16 for orientationally securing the insignia plate 12 on the cover plate 10. In this manner a selected insignia plate 12 may be used with the invention, and alternately a different insignia plate may replace the original plate 12.

A cover such as the plastic cap 1 may be used to seal the bearing means 3 to exclude debris, such as dirt and dust, while assuring that lubricant is available to the bearing means 3. The portion 21 of the cover plate 10, as best understood from FIGS. 1A and 1B, is preferably hollow, as shown, to lighten it with respect to the portion containing the weighting element 9. In this manner the force moment that maintains orientation of cover plate 10 is increased and the cover plate 10 is able to be made relatively thin yet functionally achieve the objectives of the present invention.

The wheel mounting cavity 18A provides a circular cavity sidewall 17 and an annular cavity lip 27 that extends inwardly from the sidewall 17 and defines an aperture 29 of the mounting cavity 18A. The mounting base 8 provides an outer circular base wall 10B engaged within the cavity 18A. The mounting base 8 also provides an annular base lip 10C that extends outwardly into contact with an outwardly facing surface of the cavity lip 27 and seals the mounting cavity aperture 29.

The wheel mounting cavity 18A may further include, as shown in FIG. 3, an outer circular indentation 37, the outer circular base wall 10B of the mounting base 8 is engaged within the cavity 18A while the cover plate 10 is engaged in juxtaposition within the circular indentation 37 so as to flush mount the device on the wheel. Please note that the device cannot be removed from the wheel 18 from the front face of the wheel. To remove the device, the bolts 4 must be loosened from the rear of the insignia plate 12 so that the device may clear the annular cavity lip 27.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A wheel cover device for an automotive wheel having an axis of rotation, the device comprising:

a mounting base having a means for wheel engagement and a means for bearing engagement, the mounting base being fixedly supported within a mounting cavity formed on the axis of rotation of the automotive wheel by the wheel engagement means;

a bearing means engaged within the bearing engagement means of the mounting base and positioned for rotation on the axis of rotation;

a cover plate positioned adjacent to the bearing means, the cover plate providing a cover plate mounting hole positioned on the axis of rotation and a means for weighting, the weighting means being asymmetrical to the axis of rotation and supported in the cover plate by a peripherally enclosing side lip, the side lip having a negative draft angle thereby capturing the weighting means within the cover plate;

a means for rotational engagement between the cover plate and the bearing means so that with the automotive wheel and the mounting base in rotation, the cover plate is biased by the weighting means to maintain a non-rotating position with the weighting means urging the cover plate toward a preferred attitude as the wheel rotates;

the mounting cavity providing a circular cavity sidewall and an annular cavity lip extending inwardly therefrom and defining an aperture of the mounting cavity, the mounting base providing an outer circular base wall engagable within the cavity, and an annular base lip extending outwardly into contact with an outwardly facing surface of the cavity lip thereby sealing the mounting cavity aperture.

2. The device of claim 1 further including an insignia plate, the means for rotational engagement being a shaft fixed to, and extending outwardly from the insignia plate, the shaft penetrating the mounting hole of the cover plate and the bearing means and secured thereto with a shaft locking means.

3. The device of claim 2 wherein the insignia plate and cover plate jointly provide a common interengagement means for orientationally securing the insignia plate on the cover plate.

4. The device of claim 1 further including an insignia plate, the means for rotational engagement being a shaft removably engaged with, and extending outwardly from the insignia plate, the shaft penetrating the mounting hole of the cover plate and the bearing means and secured thereto with a shaft locking means.

5. The device of claim 4 wherein the insignia plate and cover plate jointly provide a common interengagement means for orientationally securing the insignia plate on the cover plate.

6. The device of claim 1 wherein the automotive wheel mounting cavity provides a circular cavity sidewall, an annular cavity lip extending inwardly therefrom and defining an aperture of the mounting cavity, and further an outer circular indentation, the mounting base providing an outer circular base wall engagable within the cavity, and an annular base lip extending outwardly into contact with the cavity lip thereby sealing the mounting cavity aperture, the cover plate being engaged in juxtaposition within the circular indentation so as to flush mount the device at an outer face of the wheel.

7. A combination comprising:

an automotive wheel having an axis of rotation; and a wheel cover device, the device providing;

a mounting base having a means for wheel engagement and a means for bearing engagement, the mounting base being fixedly supported within a mounting cavity formed on the axis of rotation of the automotive wheel by the wheel engagement means;

a bearing means engaged within the bearing engagement means of the mounting base and positioned for rotation on the axis of rotation;

a cover plate positioned adjacent to the bearing means, the cover plate providing a cover plate mounting hole positioned on the axis of rotation and a means for weighting, the weighting means being asymmetrical to the axis of rotation and supported in the cover plate by a peripherally enclosing side lip, the side lip having a negative draft angle thereby capturing the weighting means within the cover plate;

a means for rotational engagement between the cover plate and the bearing means so that with the automotive wheel and the mounting base in rotation, the cover plate is biased by the weighting means to maintain a non-rotating position with the weighting means urging the cover plate toward a preferred attitude as the wheel rotates;

the mounting cavity providing a circular cavity sidewall and an annular cavity lip extending inwardly therefrom and defining an aperture of the mounting cavity, the mounting base providing an outer circular base wall engagable within the cavity, and an annular base lip extending outwardly into contact with an outwardly facing surface of the cavity lip thereby sealing the mounting cavity aperture.

8. The device of claim 7 further including an insignia plate, the means for rotational engagement being a shaft fixed to, and extending outwardly from the insignia plate, the shaft penetrating the mounting hole of the cover plate and the bearing means and secured thereto with a shaft locking means.

9. The device of claim 8 wherein the insignia plate and cover plate jointly provide a common interengagement means for orientationally securing the insignia plate on the cover plate.

10. The device of claim 7 further including an insignia plate, the means for rotational engagement being a shaft removably engaged with, and extending outwardly from the insignia plate, the shaft penetrating the mounting hole of the cover plate and the bearing means and secured thereto with a shaft locking means.

11. The device of claim 10 wherein the insignia plate and cover plate jointly provide a common interengagement means for orientationally securing the insignia plate on the cover plate.

12. The device of claim 8 wherein the automotive wheel mounting cavity provides a circular cavity sidewall, an annular cavity lip extending inwardly therefrom and defining an aperture of the mounting cavity, and further an outer circular indentation, the mounting base providing an outer circular base wall engagable within the cavity, and an annular base lip extending outwardly into contact with the cavity lip thereby sealing the mounting cavity aperture, the cover plate being engaged in juxtaposition within the circular indentation so as to flush mount the device at an outer face of the wheel.

* * * * *